Jan. 15, 1929.　　　　　　　E. E. CLARK　　　　　1,699,095
CHECK VALVE
Filed Aug. 22, 1927
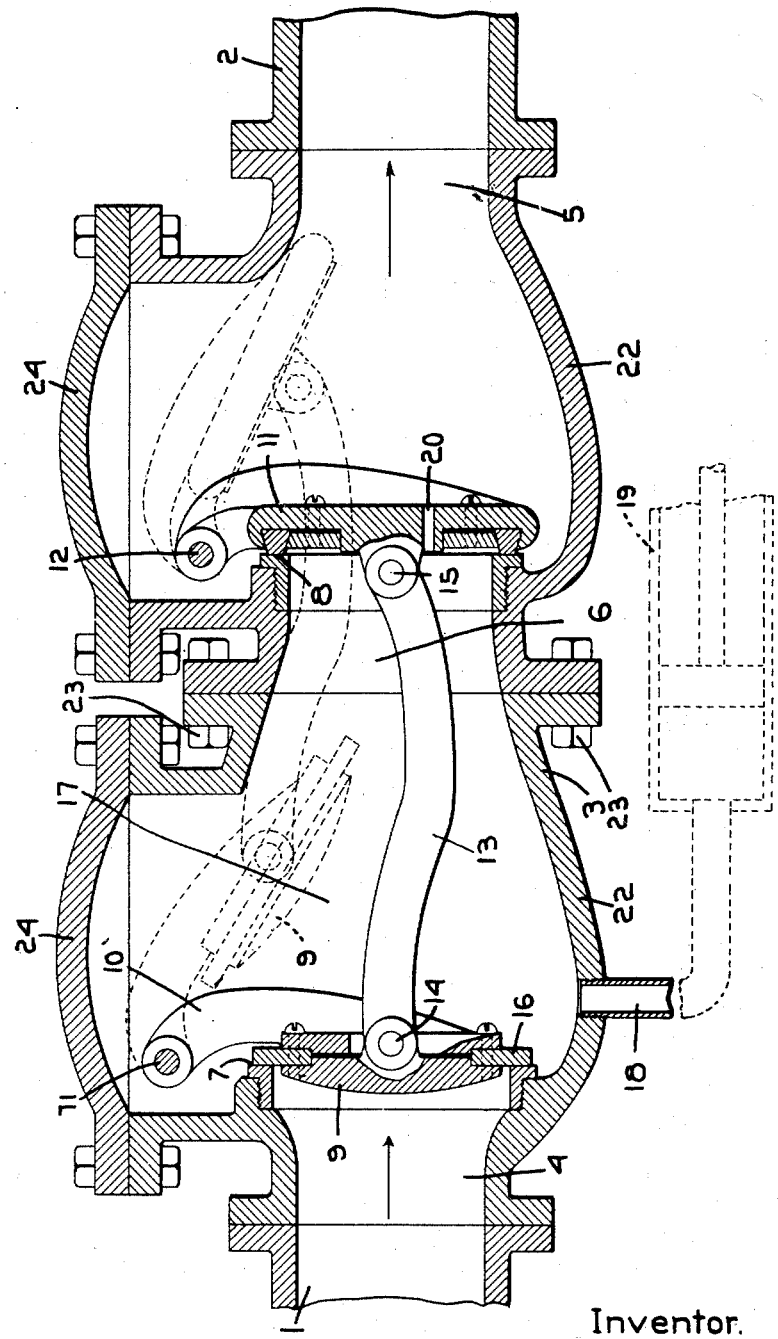
Inventor.
Ezra E. Clark
by Heard Smith & Tennant.
Attys Patented Jan. 15, 1929.

1,699,095

UNITED STATES PATENT OFFICE.

EZRA E. CLARK, OF NEWTONVILLE, MASSACHUSETTS.

CHECK VALVE.

Application filed August 22, 1927. Serial No. 214,460.

This invention relates to check valves and has for one of its objects to provide a novel check valve structure arranged so that it may be locked in closed relation from a point remote from the check valve and may be also released from said point.

Another object of the invention is to provide a check valve structure arranged to be locked in closed relation by hydraulic means which may be controlled from a remote point.

Other objects of the invention are to improve generally check valves in the particulars hereinafter set forth.

In the preferred embodiment of my invention I employ two connected check valves having a tandem arrangement, the valve adjacent the supply or inlet end being larger than the other valve, and I provide for building up a pressure in the space between said check valves, which pressure acts differentially on the check valves owing to their different sizes and thus locks them in closed relation.

In order to give an understanding of the invention I have illustrated in the drawings a selected embodiment thereof which will now be described after which the novel features will be pointed out in the appended claims.

The drawings show a sectional view of a check valve embodying my invention.

In the drawing 1 and 2 indicate two pipe sections of the length of pipe in which the check valve is incorporated, 1 being at the inlet end and 2 at the discharge end.

My improved check valve comprises a casing 3 having an inlet 4 communicating with the pipe section 1 and a discharge or outlet 5 communicating with the pipe section 2, said casing also having a waterway 6 extending therethrough between the inlet and the outlet. The casing is further provided with two valve seats 7 and 8 arranged in the waterway, the valve seat 7 which is adjacent the inlet 4 being larger than the valve seat 8 which is adjacent the outlet 5.

9 is a clapper adapted to seat on the valve seat 7, said clapper being herein shown as carried by an arm 10 which is pivoted to the casing at 11. This valve clapper is designed normally to open freely to allow fluid to flow from the inlet to the outlet but is intended to close automatically to prevent a back flow.

Co-operating with the valve seat 8 is a second valve clapper 11 which is shown as pivoted to the valve casing at 12. The two clappers are connected by a link 13 which is pivoted to the clapper 9 at 14 and to the clapper 11 at 15. Said clappers thus have a tandem arrangement and are connected so that they open and close simultaneously.

In order to permit both valve clappers to seat properly notwithstanding their being connected together I propose to make one of them (the clapper 9 in this embodiment) with a flexible peripheral flap 16 which engages the seat 7, such flap providing a yielding portion will fit against the seat 7 notwithstanding the fact that the clapper 9 is connected to the other clapper 11.

Under normal conditions the valve clappers will function as an ordinary check valve in allowing water or fluid to flow from the inlet to the outlet but they will automatically close to prevent back flow.

It is sometimes desirable to lock the clapper 9 closed so as to prevent any flow of water from the inlet to the outlet and in accordance with the present invention this is accomplished by building up a pressure in the chamber 17 between the two clappers which is greater than the pressure on the inlet side of the check valve and which acts differentially against the clappers owing to their different sizes to hold the clapper 9 closed.

The desired pressure may be produced in the chamber 17 in any suitable way. Said chamber is shown as having an inlet pipe 18 leading thereinto which extends to a pump of suitable type indicated at 19 and by which water under pressure may be pumped into the chamber 17. Since the opening through the valve seat 7 is larger than that through the valve seat 8 the pressure produced in the chamber 17 will exert a greater force on the clapper 9 tending to hold it closed than on the clapper 11 tending to open it and this differential pressure will thus act to hold both clappers closed.

The pump or other apparatus by which the pressure in the chamber 17 is controlled may be situated at a point remote from the check valve and thus the locking of the clappers in closed position may be accomplished from said remote point.

Under normal conditions the clappers will be closed onto their seats by gravity and will only open as water is being drawn from the outlet. If it is desired to lock the valve closed for any reason it is simply necessary to operate the pump 19 and thereby produce in the chamber 17 the desired pressure which will act differentially on the clappers as above described thus locking them closed. The clappers will remain closed so long as the proper pressure is maintained in the chamber 17. There may also be established by this procedure a zone of higher pressure in the chamber 17 which will prevent the flow of any water from the outlet 2 back through the inlet in case the valve leaked by reason of the clappers not being tightly seated.

In order to provide for the release of the clappers when it is desired to permit water to flow through the check valve I have herein shown the clapper 11 as provided with a small leak port 20 which will permit the pressures on opposite sides of the clapper 11 to become equalized gradually whenever the pump 19 is stopped. As soon as these pressures have been thus equalized the differential pressure on the clapper 9 will be destroyed and said clappers will function in their normal way to allow water to flow from the inlet to the outlet as needed.

The leak port 20 is sufficiently smaller than the pipe 18 so that so long as the pump 19 is working the desired pressure may be maintained in the chamber 17 notwithstanding the constant leak through the port 20. Shortly after the pump stops, however, the pressures on opposite sides of the clapper 11 will be equalized as above described thus unlocking the check valve.

The casing 3 may be made in various ways without departing from the invention. For convenience in manufacture and assembly I may make it in two sections 22, which are bolted together as shown at 23 to form the complete casing. Each section is shown as having one of the valve seats therein and each section is also provided with a removable cover 24 which when removed provides access to the interior of the casing. The making of the casing in the two sections simplifies manufacture and assembly but is not of importance so far as the invention is concerned.

I claim:

1. In a check valve structure, the combination with a casing having an inlet and an outlet and a waterway extending from the inlet to the outlet, said casing having two valve seats therein, the valve seat which is nearest the inlet being larger than the other, of two connected valve clappers arranged to be seated simultaneously on said valve seats, and means to build up a pressure in the space between said clappers, whereby the differential pressure on the clappers will hold them closed.

2. In a check valve structure, the combination with a casing having a waterway therethrough, of two connected valve clappers in said casing, one of which is larger than the other, and means to build up a pressure in the space between the clappers, whereby the differential pressure thereon will hold them closed.

3. In a check valve structure, the combination with a casing having an inlet and an outlet, of two connected valve clappers therein arranged to open and close simultaneously, the clapper nearest the inlet being larger than the other clapper, and means to build up and maintain in the space between the clappers a pressure greater than that on the inlet or outlet side of the clappers.

4. In a check valve structure, the combination with a casing having an inlet and an outlet, of two connected valve clappers therein arranged to be seated simultaneously, the clapper nearest the inlet being larger than the other clapper, means to build up and maintain in the space between the clappers a pressure greater than that on the inlet side thereof, and means for automatically equalizing the pressure on opposite sides of the clapper nearest the outlet when the valve is to be released.

In testimony whereof, I have signed my name to this specification.

EZRA E. CLARK.